UNITED STATES PATENT OFFICE.

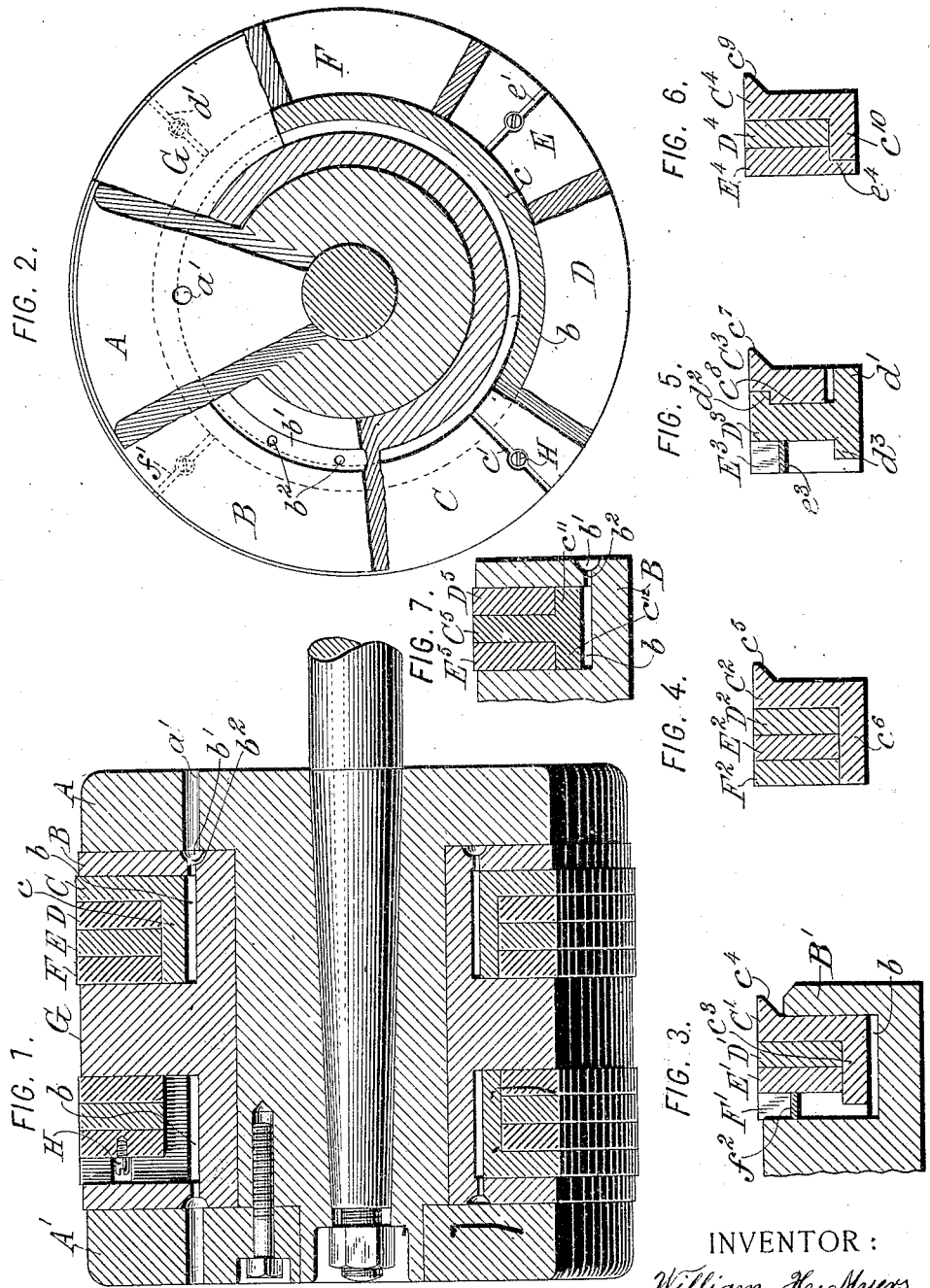

WILLIAM H. MYERS, OF BROOKLYN, NEW YORK, ASSIGNOR, BY MESNE ASSIGNMENTS, TO MYERS MACHINE WORKS, OF BROOKLYN, NEW YORK, A CORPORATION OF NEW YORK.

PISTON-PACKING.

No. 819,448.        Specification of Letters Patent.        Patented May 1, 1906.

Application filed September 7, 1900. Serial No. 29,260.

*To all whom it may concern:*

Be it known that I, WILLIAM H. MYERS, a citizen of the United States, residing in Brooklyn, in the county of Kings, city and State of New York, have invented certain new and useful Improvements in Piston-Packings, of which the following is a specification.

My invention provides a piston-packing composed of a series of rings so arranged as to secure the maximum flexibility and consequent ease of movement.

My invention provides also a piston-packing having various other points of advantage, as set forth in the following specification.

In the accompanying drawings, Figure 1 is is an approximately diametrical section of a piston containing my improved packing. Fig. 2 is a series of superposed partial sections at the planes of the piston-face, the bull-ring, and the several packing-rings of Fig. 1; and Figs. 3, 4, 5, 6, and 7 are sections showing various arrangements of the rings in my improved packing.

The principal elements of my packing are a main ring having a radially-extending body and an inner axially-extending flange and a series of rings carried (either in whole or in part) by such flange and constituting, in effect, a single ring of great flexibility. Each ring is split at one point, the successive splits being staggered relatively to each other, so as to allow practically no leakage.

Referring to the drawings, A is the piston, and A' the follower: Between these two is carried the bull-ring B, in which are one or two grooves $b$. All these parts are of the usual or of any other suitable type and require no further description. For the purpose of admitting steam to the grooves of the bull-ring I provide in the face portion of the piston and in the follower one or more ports $a'$. In the faces of the bull-ring I provide annular grooves $b'$, which coincide with the ports $a'$ and which communicate with the packing-groove $b$ of the bull-ring by a series of ports $b^2$. Carried in said packing-grooves are the series of rings which constitute my packing. C is a main ring whose outside diameter is slightly greater than that of the bull-ring and whose inside diameter is such that it rides loosely in the groove of the bull-ring, so as to leave a slight space between the bottom of such groove and the inner circumference of the ring C. The ring C is formed with a flange, preferably of the full width of the packing-groove in the bull-ring, as shown in Fig. 1. It is common to use a ring of this sort having a short flange and carrying on such flange a supplementary ring. One of my points of improvement consists in dividing said supplementary ring into a plurality of separate rings. By this construction I secure greater flexibility than in the old packing. In the movement of the piston each of the rings D, E, and F in turn yields to irregularities of the surface, and the resistance to such yielding is only one-third of that which would be encountered if the three rings were in one, though the strength remains practically the same. Furthermore, by the use of a plurality of rings I secure a much tighter construction than is possible with a single ring. Each of the rings C, D, E, and F is split at one point. In order to provide the longest possible path for the escape of steam, the joints or splits of the successive rings should be arranged diametrically opposite to each other. Each ring, however, has two definite bearing-points against the walls of the cylinder, these points being ninety degrees on either side of the joint. Since the arrangement of all of the joints diametrically opposite each other would bring into coincidence the bearing-points of all the rings, I modify such arrangement as follows: The joint of the ring C (shown at $c'$, Fig. 2) and that of the ring D (shown at $d'$) are diametrically opposite. The joint $d'$ of the ring D and the joint $e'$ of the ring E are arranged ninety degrees apart, while the joint $e'$ and the joint $f''$ of the ring F are again arranged diametrically opposite. By this arrangement the packing-ring as a whole has four points of bearing ninety degrees apart or practically a continuous bearing around the entire circumference, since the points of bearing are not points in the ordinary sense, but arcs of considerable length, and I thus secure the maximum tightness consistent with a perfectly smooth bearing.

In order to preserve the relation of the rings to each other, I provide a series of pins or the like between the successive rings to prevent one from turning with respect to the other. As shown in Fig. 2, the rings of each adjacent pair are connected in this way, thus holding all the rings together as a single ring.

In operation the piston sometimes moves quite far into the counterbore, so far, in fact, that the three rings nearest the end will be entirely within the counterbore. In such case, however, the connection which I have just described between the rings prevents those rings which are within the counterbore from falling. The most convenient form of connection between the adjacent rings consists in a bull-headed screw H, as shown in Fig. 1, of which the body enters one ring and the head fits into a space cut out to receive it at the joint of the other ring.

In operation the steam enters the port $a'$ on the steam side of the cylinder and through the groove $b'$ and passages $b^2$ is admitted to the groove $b$ of the bull-ring, where its expansive force presses the packing-ring C and through it the rings D, E, and F outward against the walls of the cylinder. As explained before, my divided packing moves against the walls of the cylinder with great flexibility and tightness. At the side of the piston at which there is no steam the packing is idle, the two packings operating alternately with successive strokes of the piston.

One of the important advantages of my invention is its simplicity and convenience of assembling, the individual parts being small, light, and easily connected, while the assembled packing is very strong and tight. By making the wearing-faces, as shown in Fig. 1, of each of the rings of equal area I insure equal wear on the different rings and equal life thereof. It will also be noted that the expansive action of the steam will be equally distributed on the four rings, that on the flange $c$ being distributed directly to the rings D, E, and F, whereby a uniform surface-pressure on all the rings is obtained.

Having described with great particularity of detail one form of packing embodying my invention, and having set forth the principle thereof, it is obvious that many modifications of the form described may be made without departing from the spirit of the invention. For example, Fig. 3 shows the principle of my invention applied to a packing having a main flanged ring $C'$ and a supplementary ring of greater width than the flange $c^3$ of the ring $C'$, the supplementary ring being, as in Fig. 1, divided into three separate rings $D'$, $E'$, and $F'$. Since the flange $c^3$ does not entirely cover the steam-chamber $b$, the steam would escape therefrom through the splits in the last ring $F'$, and it is necessary, therefore, to insert a bridge-piece $f^2$ across this joint to prevent such escape of steam. This bridge-piece is well known in packings and need not be described in detail. The main ring $C'$ is also provided with a lip $c^4$, commonly known as the "St. John" lip, and under which the steam passes and acts to expand the ring $C'$. $B'$ is the bull-ring of any suitable design.

Fig. 4 shows a modification of the form shown in Fig. 1, which consists in merely adding the St. John lip $c^5$ to the main ring $c^2$. The other rings $D^2$, $E^2$, and $F^2$ are identical with the corresponding rings in Fig. 1. This packing, as well as all the others illustrated, may, as stated, be used with any suitable form of bull-ring and piston or follower.

In Fig. 5 the main ring $C^3$ is provided with a St. John lip $c^7$ and with a very deep flange $c^8$. The supplementary ring is composed of only two individual rings $D^3$ and $E^3$, the former supported by the flange of the main ring $C^3$ and the latter supported by the flange $d^3$ on the ring $D^3$. Where this packing is used with a steam-chamber below the flange of the ring D, a bridge-piece $e^3$ in the split of the ring $E^3$ must be employed. In such case also the ring $D^3$ is provided with a flange $d'$ at its forward end. For supporting the ring $D^3$ on the ring $C^3$, I use a flange $d^2$. The flange $c^8$ on the ring $C^3$ is slightly less in depth than the distance between the flanges $d^2$ and $d'$, the pressure of the steam holding it out against the under side of the flange $d^2$.

In Fig. 6 I show a construction similar to that of Fig. 3. $C^4$ is the main ring, having a St. John lip $c^9$ and a flange $c^{10}$. The supplementary ring is divided into but two parts $D^4$ and $E^4$. The ring $E^4$ is shouldered at $e^4$ over the end of the flange $c^{10}$.

In Fig. 7 $C^5$ is the main ring and the flange portion is extended equal distances on opposite sides of the body portion thereof, as at $c^{11}$ $c^{12}$. The supplementary ring is composed of two parts $D^5$ and $E^5$, one of which is supported on each of the opposite ends $c^{11}$ $c^{12}$ of the flange portion of the main ring. A bull-ring B, having a groove $b$ and ports $b^2$ identical with those of Fig. 1, is used. The main ring of the packing takes the pressure and communicates it to the two parts of the supplementary ring in the same way as for the construction shown in Fig. 1.

Many other modifications are possible, based on the same inventive idea, and it will be understood that I do not limit myself to any or to all of the specific constructions described.

What I claim, and desire to secure by Letters Patent, is a packing having in combination the following defined novel features, substantially as set forth:

1. The combination of a main ring having a radially-extending body and an inner axially-extending flange, and a supplementary ring composed of a plurality of individual continuous rings supported on said flange and adapted to be pressed outward by the expansion of said main ring, the bearing-faces and the bodies of said main ring and each of said individual rings being of the same width, and means for admitting steam under the flange of said main ring, whereby the rings wear equally and are subjected to the same expansive pressure.

2. The combination of a main ring having a radially-extending body and an inner axially-extending flange, and a supplementary ring composed of three individual continuous rings supported on said flange and adapted to be pressed outward by the expansion of said main ring, each of said rings having a subdividing slit, the slits of each outer ring and its adjacent ring being diametrically opposite and those of the two intermediate rings being ninety degrees apart.

3. The combination of a main ring having a radially-extending body and an inner axially-extending flange, and a supplementary ring composed of a plurality of individual continuous rings supported on said flange, an outer one of said individual rings extending beyond the end of said flange and shouldered over such end.

4. The combination of a main ring having a radially-extending body and an inner axially-extending flange, and a plurality of individual continuous rings supported on said flange and adapted to be pressed outward by the expansion of said main ring, the bodies of said individual rings and of said main ring being of substantially equal cross-section.

5. The combination of a piston having ports $a'$, a bull-ring having a packing-groove $b$ and a groove $b'$ communicating with said ports and with said packing-ring groove, and a packing in said packing-ring groove consisting of a main ring having a radially-extending body and an inner axially-extending flange, and a plurality of individual rings supported on said flange.

6. The combination of a plurality of rings, the adjacent rings being connected by means of a screw H whose body screws into one ring and whose head fits into a space cut out of the other.

7. The combination of a main ring $C^3$ having an inner flange $c^8$, a second ring $D^3$ having a portion $d^2$ supported on said main-ring flange, and having an inner flange $d^3$, and a third ring $E^3$ supported on said flange $d^3$.

In witness whereof I have hereunto signed my name in the presence of two subscribing witnesses.

WILLIAM H. MYERS.

Witnesses:
 DOMINGO A. USINA,
 FRED WHITE.